United States Patent [19]
Bailleux et al.

[11] Patent Number: 5,402,705
[45] Date of Patent: Apr. 4, 1995

[54] CONTROL DEVICE FOR AN ELECTRICAL HOUSEHOLD APPLIANCE ADAPTED TO PREPARE INFUSION BEVERAGES

[75] Inventors: Jean-Philippe Bailleux, Damigny, France; Gregor Storsberg; Stephan Buchmann, both of Solingen, Germany

[73] Assignee: Moulinex S.A., Bagnolet, France

[21] Appl. No.: 194,383

[22] Filed: Feb. 10, 1994

[30] Foreign Application Priority Data

Feb. 10, 1993 [FR] France .................. 93 01445

[51] Int. Cl.$^6$ .................................. A47J 31/00
[52] U.S. Cl. .......................... 99/281; 99/307; 392/480
[58] Field of Search ............. 99/279, 280, 281, 282, 99/283, 300, 307; 219/501; 392/480, 481, 467

[56] References Cited

U.S. PATENT DOCUMENTS

| | | |
|---|---|---|
| 3,570,390 | 3/1971 | Jordan et al. |
| 4,531,046 | 7/1985 | Stover. |
| 4,758,709 | 7/1988 | Schiebelhuth .................. 392/480 |
| 5,014,611 | 5/1991 | Illy ................................ 99/281 |
| 5,193,139 | 3/1993 | Schiettecatte .................. 392/480 |

FOREIGN PATENT DOCUMENTS

| | | |
|---|---|---|
| 0186097 | 7/1986 | European Pat. Off. . |
| 2813684 | 10/1979 | Germany . |
| 3021276 | 12/1981 | Germany . |
| 8701916 | 11/1987 | Germany . |

Primary Examiner—Robert W. Jenkins
Attorney, Agent, or Firm—Young & Thompson

[57] ABSTRACT

Control device (1) for an electrical household appliance for the preparation of infusion beverages, having a housing (2) enclosing a reservoir (3) for cold water, a heating plate (4) supported an infusion collector (5), a water heater (6) connected thermally to the plate (4) and having a conduit (6') connected to the cold water reservoir (3) and a rising conduit (6") connected to a water pipe (7) of an infusion filter (8) disposed above the infusion collector (5). An electrical heating resistance (9) for the water heater (6) is connected to an electrical supply circuit (10) switchingly controlled by the device. The device supplies the electrical resistance (9) in a first phase intermittently by current pulses of predetermined duration, separated by pause times also of predetermined duration, and in a second phase supplies the electrical resistance (9) with a direct current.

9 Claims, 2 Drawing Sheets

CONTROL DEVICE FOR AN ELECTRICAL HOUSEHOLD APPLIANCE ADAPTED TO PREPARE INFUSION BEVERAGES

BACKGROUND OF THE INVENTION

1. Field of the Invention

The present invention relates to a control device for an electrical household appliance which is adapted for the preparation of infusion beverages such as, for example, coffee, tea or a similar beverage, and which is of the type comprising a housing enclosing a reservoir for cold water, a heating plate adapted to support an infusion collector, a water heater thermally connected to the plate and comprising a conduit connected to the reservoir of cold water and a rising conduit connected to a water channel of an infusion filter disposed above the infusion collector, and an electric resistance of the water heater connected to an electrical supply circuit.

2. Description of the Related Art

Coffee or teamakers of this type are generally fairly poorly adapted for the preparation of small quantities of beverage. Upon starting the apparatus, the water contained in the water heater is quickly brought to boiling, which displaces the still-cold column of water from the rising portion of the conduit toward the water channel and as a result cold water is poured onto the grounds to be infused. On the other hand, the infusion collector adapted to recover the beverage is also cold when the first droplets of coffee or tea are poured into it. The infusion collector is in general a glass server, and hence a poor conductor of heat, through which the heat of the heating plate diffuses only slowly.

As a result, when it is desired to prepare only a small quantity of tea or coffee, for example one or two cups, the result is often tepid and insipid.

SUMMARY AND OBJECTS OF THE INVENTION

To overcome this drawback, there is provided in general at the outlet of the cold water reservoir a valve which opens only when the conduit, the heating plate and the server have reached a predetermined temperature.

This system, although solving the described problem, is however not satisfactory. In effect, the mounting of a valve at the outlet of the water reservoir, whether mechanical or electromagnetic, is a particularly costly solution. Moreover, the water heater being heated is "dry", there is produced when the valve is opened a pulse of steam which, even if it acts against calcium deposits, is particularly noisy and startling to the user.

The object of the present invention is to provide in a simple manner an electrical household appliance for the preparation of infusion beverages, of the type comprising a water heater heated by a resistance, which permits preparing small quantities of beverage. Another object is to provide a device adaptable to existing electrical coffee or teamakers on the market so as to correct the undesirable effects of the production of a tepid beverage in operation.

According to the present invention, the control device is adapted to supply the electrical resistance in a first phase in an intermittent fashion by current pulses of predetermined duration, separated by pause times also of predetermined duration, and in a second phase continuously.

Thanks to the invention, the heating plate and the water heater are during operation of the apparatus maintained at a temperature such that the water of the water heater does not boil too quickly, and that the server disposed on the heating plate will be preheated with the infusion.

BRIEF DESCRIPTION OF THE DRAWINGS

The characteristics, details and advantages of the invention will become apparent from the description which follows, by way of example, with reference to the accompanying drawings, in which.

DESCRIPTION OF THE PREFERRED EMBODIMENTS

Figure 1:
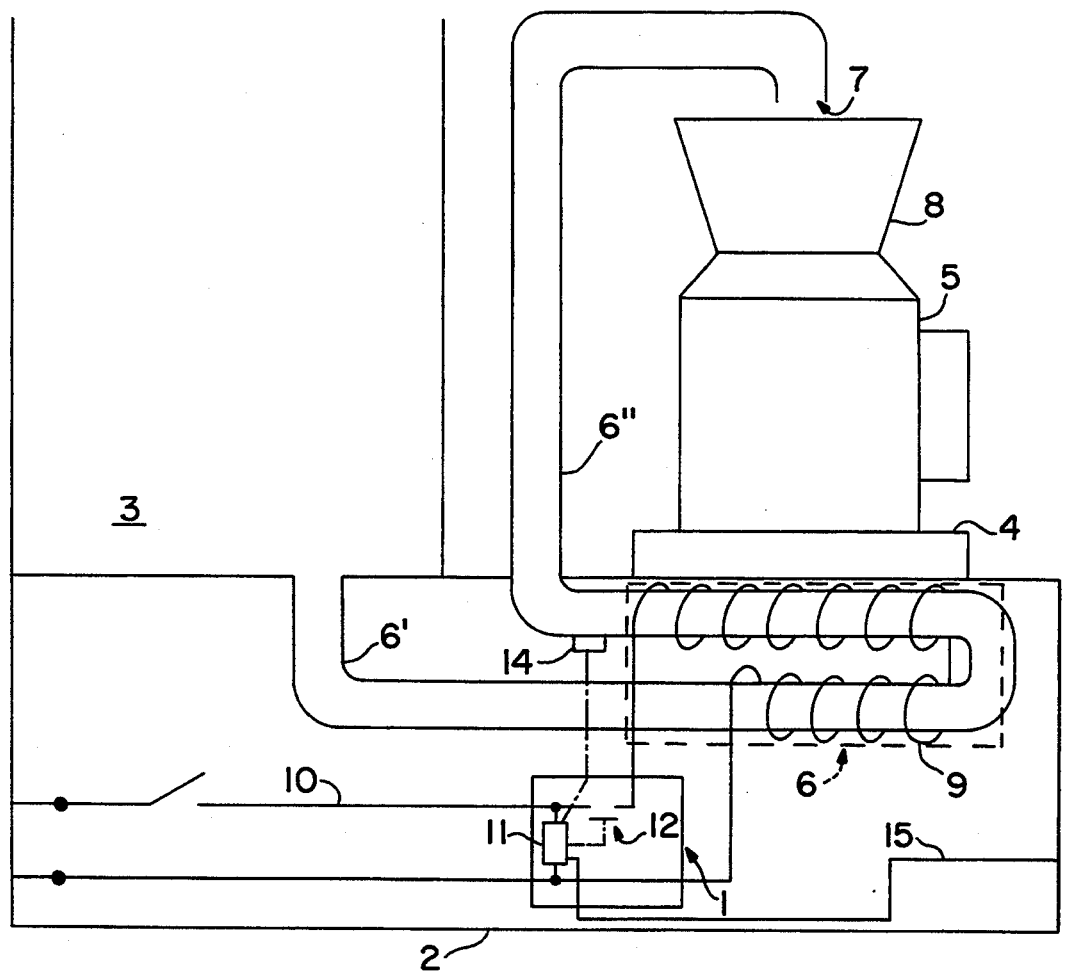
FIG. 1 is a schematic view of a control device according to the invention adapted to an electric coffeemaker with a continuous water heater.

The control device 1 is adapted for a household appliance for the preparation of infusion beverages such as for example a coffeemaker of the drip type and comprising, as shown in FIG. 1, a housing 2 enclosing a reservoir 3 for cold water, a heating plate 4, adapted to support an infusion collector 5, a continuous water heater 6 connected thermally to the plate 4 and comprising a conduit 6' connected to the water reservoir for cold water and a rising conduit 6" connected to a water channel 7 of an infusion filter 8 disposed above the infusion collector 5, which is in general a glass server, and an electrical heating resistance 9 for the plate 4 and the water heater 6, connected to an electric supply circuit 10.

According to the invention, the device 1 is mounted in the electric supply circuit 10 and is adapted to supply the electric resistance 9 in a first phase in an intermittent manner by current pulses of predetermined duration, separated by pause times also of predetermined duration, and in a second phase continuously.

When the coffeemaker also comprises a control device 13 (FIG. 2), for example a thermostat or a safety device which cuts off the feed of the resistance when the apparatus is overheated, the second continuous supply phase can nevertheless be momentarily interrupted in a cyclical manner by this thermostat.

Figure 2:
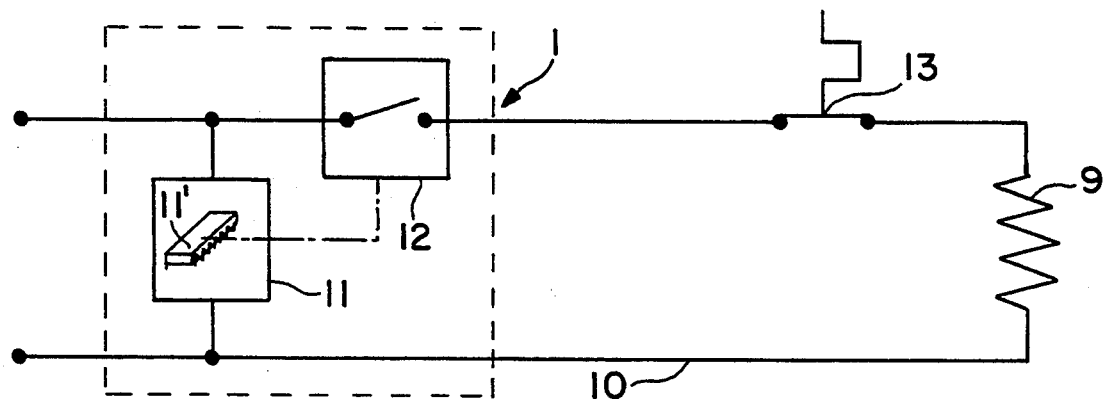
FIG. 2 is a schematic electrical diagram of the control device according to the invention showing the supply of a heating resistance of the water heater.

The control of the supply of the heating resistance 9 is effected by opening and closing the supply circuit 10. Effectively, as is shown in FIG. 2, the electronic device 1 comprises a control unit 11 controlling by means of a commutator 12 the supply of the resistance.

The commutator 12 is mounted in the electrical circuit 10 and occupies two positions, either a conductive position in which it closes the circuit 10, or a nonconductive position in which the circuit is open.

A commutation means would preferably be provided by a relay or an electronic semiconductor switch, such as a triac for example.

According to a preferred embodiment of the invention, the control unit 11 of the device comprises a microprocessor 11' and timer adapted to deliver via an outlet stage a control signal applied either to the winding of a relay or to the control electrode or trigger of a triac.

The microprocessor 11' of the control unit could also integrate other functions such as regulation of the temperature of the resistance, or different safety functions, taking into account (for example) information gathered by the thermal sensors 14 (FIG. 1) disposed at the outlet of the water heater.

Moreover, it is possible to connect to the microprocessor a display unit 15 permitting particularly to display the stages of the evolution of the infusion process, for example a green light signal for the first phase and red for the second phase. This display unit also permits, from the timer signal, to display for example the time.

Figure 3:
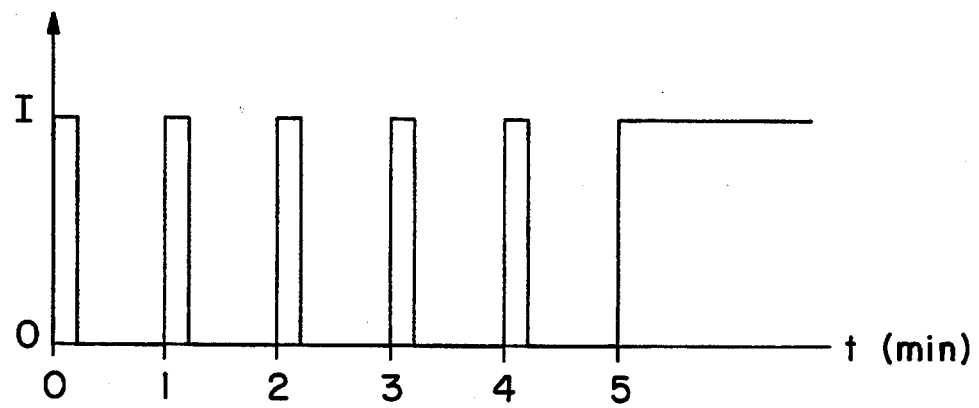
FIG. 3 is a graphical representation of the current supply applied to the heating resistance.

The graphical representation of the current applied to the heating resistance 9 in FIG. 3 shows that the duration of each current pulse of the first phase is short relative to the duration of the pause between two pulses.

During current supply to the device and the coffeemaker, the current pulses are applied to the resistance which heats the water heater 6 and the plate 4.

The duration of the pulses and the pause times separating two successive pulses should be determined such that the water does not boil during the first phase. The water contained in the water heater transmits a portion of its heat to the water contained in the rising conduit 6", particularly during the pause times.

The server 5 of glass, therefore of a material of low thermal conductivity, is heated by conduction by the heat of the heating plate 4. Effectively, the thermal inertia of the plate 4 and above all of the server 5 is substantially higher than that of the water heater and of the water in the conduit 6", also the interval of time between two pulses is put to use to transfer progressively the heat of the plate 4 to the server 5 without it having time to cool in contact with the air for example.

The duration of the pause times and the number of current pulses are determined particularly as a function of the speed of thermal conduction in the conduit 6" and of the thermal inertia of the server 5.

After several pulses, all the water in the conduit 6" as well as the server 5 will be reheated and the second phase can begin.

During the second phase, there is applied in a continuous fashion current to the resistance 9. The water is rapidly brought to boiling and the normal infusion process commences.

The control device 1 could preferably be located within a coffeemaker for example or in an electric teamaker and be directly integrated with the electronic circuit. Another possibility (not shown in the drawings) is to provide the device in the form of a self-contained module comprising its own supply cord and socket for a coffeemaker or teamaker. It is thus possible to adapt the device to existing coffeemakers on the market without having to modify the latter. Of courser the module could be programmed or adapted as a function of the characteristics of the apparatus to which it is adapted.

Thus, thanks to the invention, it is possible to provider with a conventional coffeemaker with a heated conduit, very small quantities of very hot beverage, collected in the preheated server. Moreover, the device of the invention is of quite low cost and adaptable to different models of coffeemakers; it is event in a particular embodiment, useable with coffeemakers not originally adapted for such a device.

Modifications of the invention herein disclosed will occur to a person skilled in the art and all such modifications are deemed to be within the scope of this invention as defined by the appended claims.

What is claimed is:

1. Control device (1) for an electrical household appliance for the preparation of infusion beverages, comprising: a housing (2) enclosing a reservoir (3) for cold water, a heating plate (4) supporting an infusion collector (5), a water heater (6) thermally connected to the plate (4) and comprising a conduit (6') connected to the cold water reservoir (3) and a rising conduit (6") connected to a water pipe (7) of an infusion filter (8) disposed above the infusion collector (5), and an electrical heating resistance (9) for the water heater (6) connected to an electrical supply circuit (10) switchingly controlled by said control device, the device supplying, in a first control phase, current pulses of predetermined duration to the electrical resistance (9), said current pulses being separated by pause times also of predetermined duration, and, in a second control phase, supplying the electrical resistance (9) with direct current.

2. Device according to claim 1, wherein the duration of each pulse is shorter than the duration of the pause time between successive pulses.

3. Device according to claim 1, further comprising a control unit (11) controlling a communication means (12) for supplying current to the resistance (9).

4. Device according to claim 3, wherein the control unit (11) comprises a microprocessor (11').

5. Device according to claim 4, further comprising a display unit (15) to display an indication of said first and second control phases controlled by the microprocessor (11').

6. Device according to claim 3, wherein the commutation means comprises a triac.

7. Device according to claim 3, wherein the commutation means comprises a relay.

8. Device according to claim 1, wherein said device is located within an interior housing (2).

9. Device according to claim 1, wherein said devices located outside a housing (2) for the cold water reservoir (3).

* * * * *